(12) United States Patent
Inoue

(10) Patent No.: US 8,931,818 B2
(45) Date of Patent: Jan. 13, 2015

(54) MOUNTING STRUCTURE OF ASSIST GRIP

(71) Applicants: Kabushiki Kaisha Toyota Jidoshokki, Kariya-shi, Aichi (JP); Toyota Jidosha Kabushiki Kaisha, Toyota-shi, Aichi (JP)

(72) Inventor: Masashi Inoue, Kariya (JP)

(73) Assignees: Kabushiki Kaisha Toyota Jidoshokki, Aichi (JP); Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 14/066,844

(22) Filed: Oct. 30, 2013

(65) Prior Publication Data

US 2014/0117692 A1 May 1, 2014

(30) Foreign Application Priority Data

Oct. 31, 2012 (JP) ................................. 2012-240527

(51) Int. Cl.
 *B60J 9/00* (2006.01)
 *B60N 3/02* (2006.01)
(52) U.S. Cl.
 CPC ...................................... *B60N 3/026* (2013.01)
 USPC ........................................................ 296/1.02
(58) Field of Classification Search
 USPC .............................. 296/1.02, 97.9, 97.12, 214
 See application file for complete search history.

(56) References Cited

U.S. PATENT DOCUMENTS

| 5,061,005 | A | * | 10/1991 | Van Order et al. | ............ 296/97.9 |
| 5,201,564 | A | * | 4/1993 | Price | ............ 296/97.9 |
| 6,126,230 | A | | 10/2000 | Ikeda et al. | |
| 7,308,736 | B2 | * | 12/2007 | Nakazato | ........................ 24/289 |
| 8,220,858 | B2 | * | 7/2012 | Moenter | ........................ 296/97.9 |
| 2002/0021014 | A1 | * | 2/2002 | Sakuma et al. | ................ 296/1.1 |
| 2011/0101726 | A1 | * | 5/2011 | Moenter | ...................... 296/97.9 |
| 2011/0127795 | A1 | * | 6/2011 | Still et al. | ..................... 296/97.9 |
| 2014/0138986 | A1 | * | 5/2014 | Tsuneyama et al. | ..... 296/187.09 |

FOREIGN PATENT DOCUMENTS

| JP | 2003-137012 A | 5/2003 |
| JP | 2003-269422 A | 9/2003 |
| JP | 2006347265 A | 12/2006 |
| JP | 2009-78695 A | 4/2009 |

* cited by examiner

*Primary Examiner* — Lori L Lyjak
(74) *Attorney, Agent, or Firm* — Sughrue Mion, PLLC

(57) ABSTRACT

Total four notched portions, two for each of both edges, are formed in a lateral leg to which a tensile load is applied when an assist grip is normally used. In an extending direction of the lateral leg, a position of the notched portion and a position of the notched portion are different from each other. Therefore, if excessive impact force is applied to the assist grip and a compression load is applied to the lateral leg, the notched portion is bent and the lateral leg buckles while being twisted. In this case, as compared to a case where the legs buckle by being bent so that the legs are overlapped with each other, the impact force is effectively absorbed.

9 Claims, 8 Drawing Sheets

MOUNTING STRUCTURE OF ASSIST GRIP

BACKGROUND OF THE INVENTION

1. Field of the Invention

The present invention relates to a mounting structure of an assist grip in a vehicle such as an automobile.

2. Related Background Art

In order to assist an occupant in getting in and out of a vehicle, the vehicle such as an automobile is provided with an assist grip disposed on a ceiling inside a passenger compartment. For example, Japanese Unexamined Patent Application Publication No. 2003-137012 (Patent Literature 1) discloses a technology for mounting the assist grip on a vehicle body such as a roof panel or a side panel.

A mounting structure of the assist grip disclosed in Patent Literature 1 employs a bracket provided with three legs, in which the assist grip is mounted on a main body of the bracket and each leg is mounted on a roof side rail inner panel.

According to the invention disclosed in Patent Literature 1, if excessive impact force is applied to the assist grip in a direction from an inner side of the passenger compartment toward an outer side of the passenger compartment, the legs of the bracket result in bending deformation, thereby absorbing energy of the impact force to some extent.

SUMMARY OF THE INVENTION

However, in the above-described mounting structure of the assist grip, when excessive impact force is applied, legs are vigorously bent at a relatively early stage, or when the legs of a bracket have high strength, the legs are seldom deformed, thereby resulting in the excessive impact force. In these viewpoints, there is room for further improvement in impact absorption capacity.

The present invention is made to solve the above-described problem, and an object thereof is to provide a mounting structure of an assist grip which has a high impact absorption capacity when excessive impact force is applied to the assist grip.

In a mounting structure of an assist grip according to the present invention, in which the assist grip is mounted on a vehicle body via a bracket, the bracket comprises a bracket main body on which the assist grip is mounted; a plurality of plate-shaped legs which extend from the bracket main body, wherein each of tip portions of the plurality of legs is connected to the vehicle body. Out of the plurality of legs, a plurality of weak portions are formed at each of both edges of the leg to which a tensile load is applied when the assist grip is normally used. A position of the weak portion of one side edge is different from a position of the weak portion of the other side edge in an extending direction of the leg.

In the mounting structure of the assist grip, if excessive impact force is applied to the assist grip and a compression load is applied to the leg to which a tensile load is to be applied in normal use, the leg is bent at the plurality of weak portions formed at each edge of the leg. At this time, since the position of the weak portion of one side edge of the leg and the position of the weak portion of the other side edge are different from each other in the extending direction of the leg, the leg buckle while being twisted. The present inventors have newly recognized that the impact force against the assist grip is effectively absorbed in a case where the leg buckle while being twisted in this way, as compared to a case where the legs buckle by being bent so that the legs are overlapped with each other.

In addition, in the extending direction of the leg, a plurality of weak portions may be arranged in the leg such that two weak portions aligned adjacent to each other on one side edge are interposed between two weak portions aligned adjacent to each other on the other side edge. The leg is likely to be twisted if the plurality of weak portions of the leg are arranged in this way.

In addition, the weak portion may be notched. In this case, it is possible to easily form the weak portion that triggers the buckling.

In addition, the notched shape may be configured to be a curve. Since the notch is formed on the leg to which the tensile load is applied when the assist grip is normally used, the notched shape is preferably configured to be a curve from a viewpoint of avoiding excessive stress concentration.

According to the present invention, when excessive impact force is applied to an assist grip, there is provided a mounting structure of the assist grip which has a high impact absorption capacity.

DESCRIPTION OF THE PREFERRED EMBODIMENTS

Figure 1:
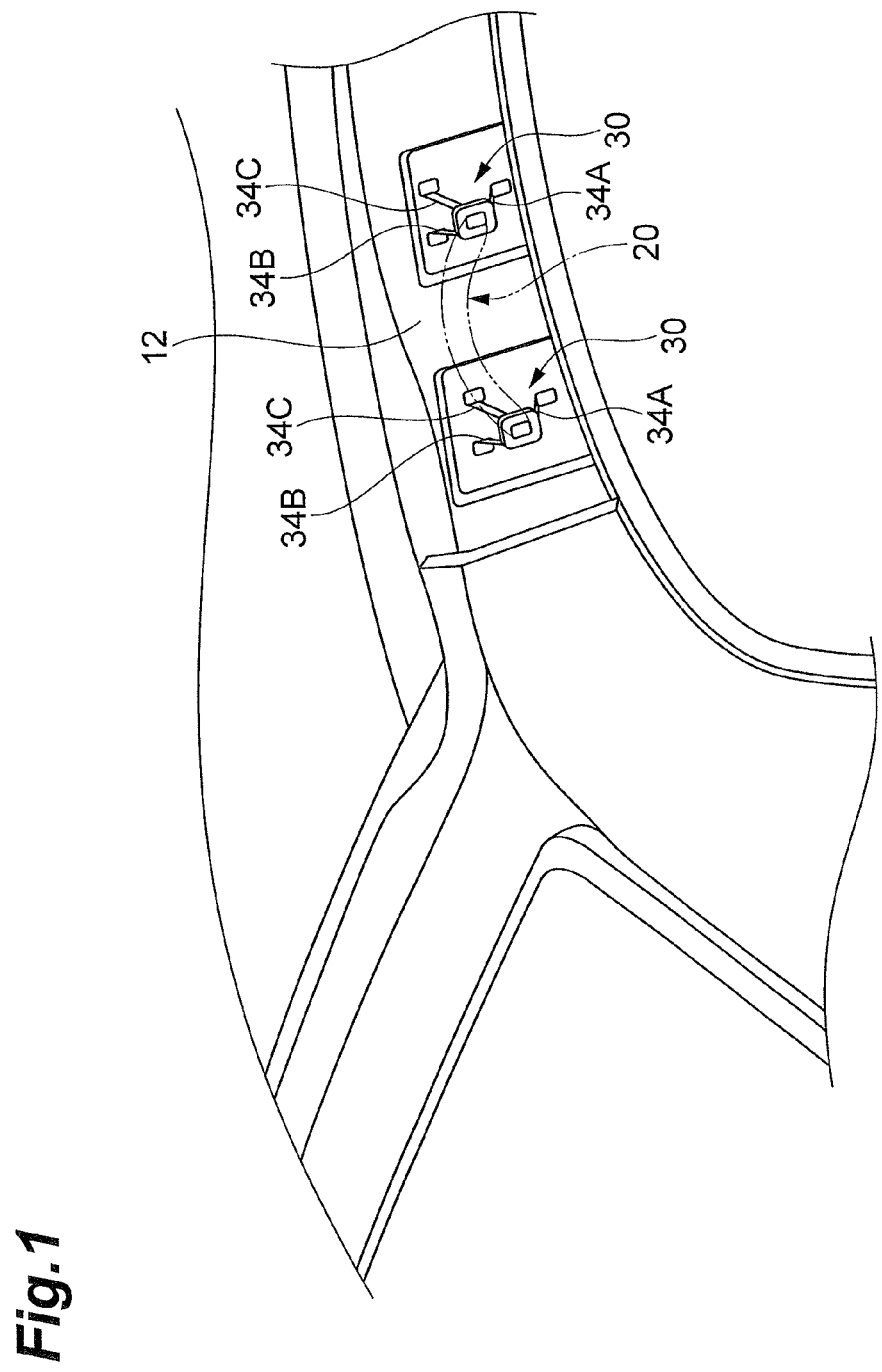
FIG. 1 is a schematic perspective view illustrating a mounting structure of an assist grip according to an embodiment of the present invention.

Hereinafter, referring to the accompanying drawings, preferred embodiments of the present invention will be described in detail. In the description, the same reference numerals are given to the same elements or elements having the same function, and the repeated description will be omitted.

Figure 2:
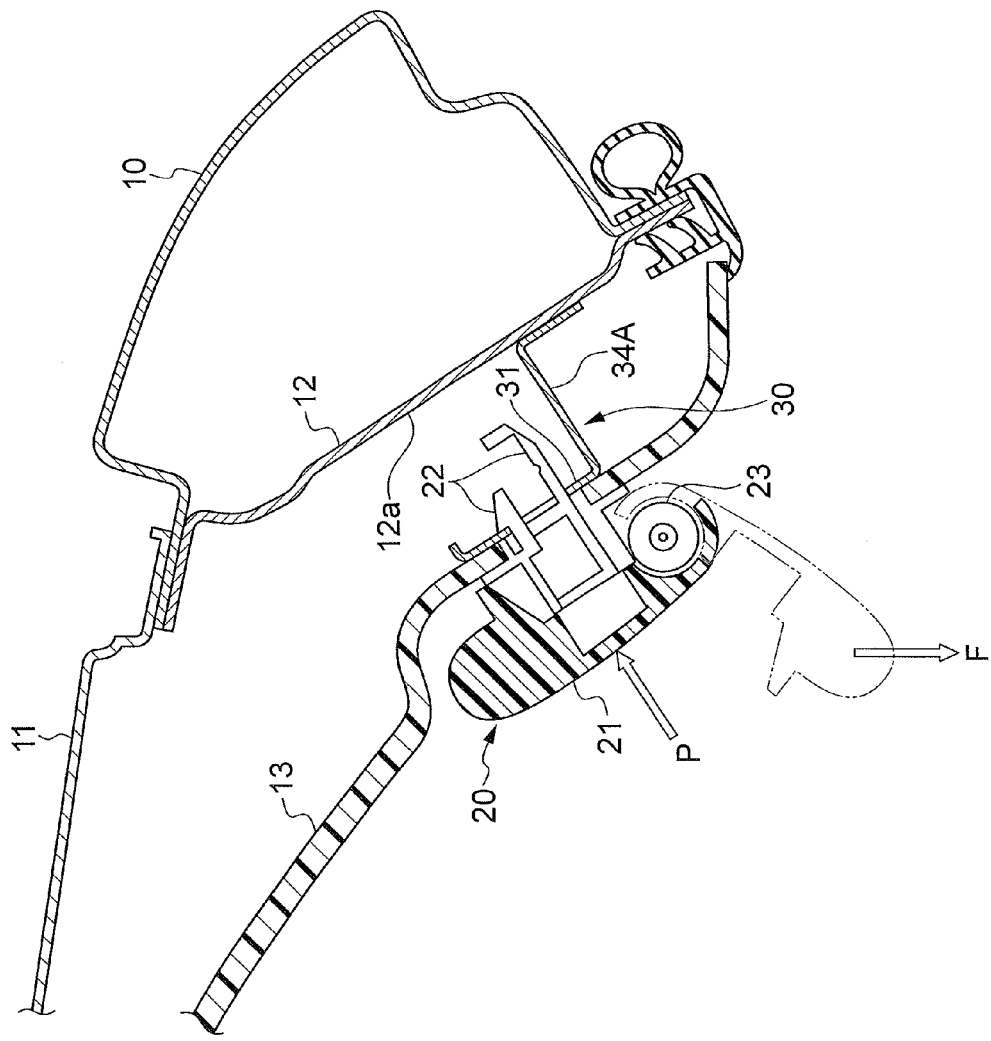
FIG. 2 is a cross-sectional view of the mounting structure of the assist grip illustrated in FIG. 1.

FIGS. 1 and 2 illustrate a mounting structure of an assist grip according to an embodiment of the present invention. An assist grip 20 is mounted on a roof side rail inner panel 12 in a side portion of a ceiling inside a passenger compartment of a vehicle via a pair of brackets 30.

More specifically, a mounting position of the bracket 30 is an inner surface 12a inside the passenger compartment of the roof side rail inner panel 12 (rail side panel coupled to a side portion of a roof panel 11) which forms a closed sectional-shaped portion by using a side body outer panel 10.

For example, the assist grip 20 includes a U-shaped grip main body 21 which is integrally molded with a synthetic resin, a support shaft 23 which is a rotation axis of the grip main body 21, and an engagement portion 22 which engages with the bracket 30.

The grip main body 21 is rotatable about the support shaft 23, and is displaced between a position not in use and a position in use by the rotation. Here, the position in non-use is a position (position illustrated by a solid line in FIG. 2) where the grip main body 21 is accommodated inside an assist grip accommodating recess formed in a molded ceiling 13 inside the passenger compartment. The position in use is a position (position illustrated by a two-dot chain line in FIG. 2) the grip main body 21 is drawn from the recess.

The engagement portion 22 has an engagement pawl. The engagement pawl is locked in a hole 32 disposed in a main body 31 of the bracket 30 (to be described later), and accordingly the assist grip 20 is fixed to the bracket 30 so as to interpose the molded ceiling 13 therebetween.

Figure 3:
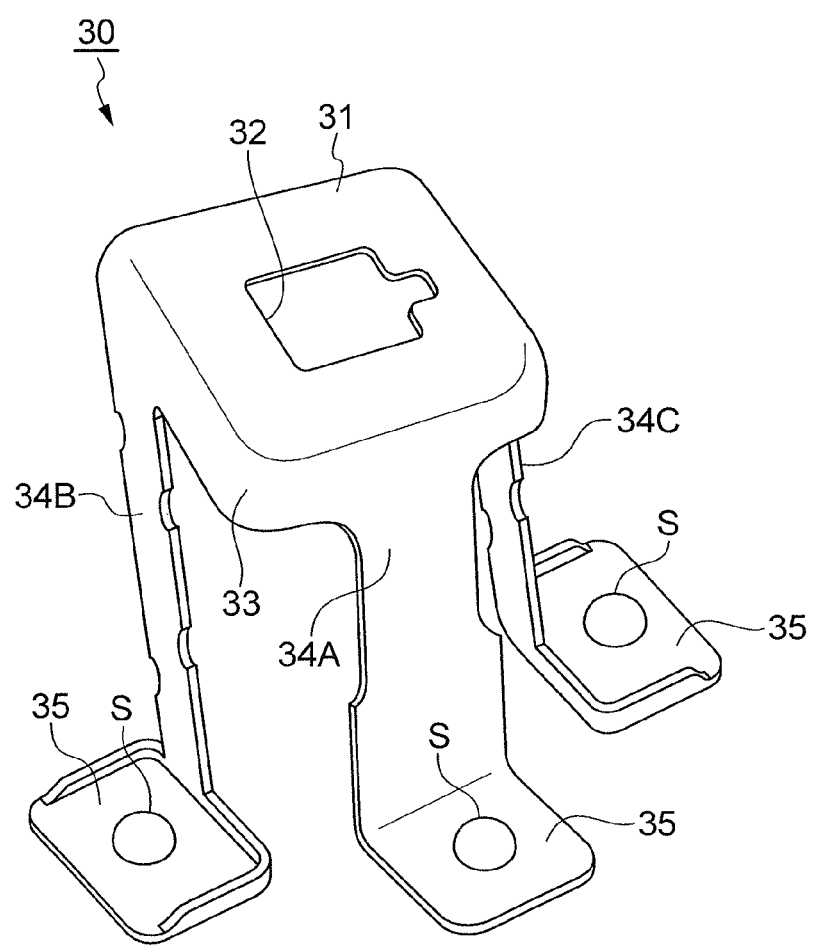
FIG. 3 is a perspective view illustrating a bracket illustrated in FIGS. 1 and 2.

As illustrated in FIG. 3, the bracket 30 includes the main body 31 which has a square plate shape, a flange portion 33 which extends to surround the main body 31 along a normal direction (thickness direction) from an edge of the main body 31, and three plate-shaped legs 34A, 34B and 34C which extend from the edge of the main body 31 in the same direction as the flange portion 33. For example, the bracket 30 can be obtained in such a manner that one piece of a steel plate is subjected to a spinning process or a bending process.

The main body 31 is a portion on which the engagement portion 22 of the above-described assist grip 20 is mounted, and the hole 32 in which the engagement pawl of the engagement portion 22 is to be locked is disposed in a central portion thereof.

The flange portion 33 is a portion obtained through the spinning process, and enhances strength of root portions of the legs 34A, 34B and 34C. Forming such a flange portion 33 effectively suppresses the legs 34A, 34B and 34C from having the root portions thereof bent.

Three legs 34A, 34B and 34C have a substantially rectangular shape, and extend from edge positions corresponding to three sides among four sides of the main body 31. Tip portions of the respective legs 34A, 34B and 34C are bent at a right angle in a direction away from the main body 31, thereby forming mounting portions 35 for spot welding S between the above-described roof side rail inner panel 12 and the bracket 30.

Three legs 34A, 34B and 34C are configured to have the central leg 34A located in the center, and two lateral legs 34B and 34C which are located at both sides thereof.

As illustrated in FIG. 1, the central leg 34A, when being mounted on the vehicle body, is arranged at a position which allows the main body 31 to be supported from below. Therefore, when the assist grip 20 is normally used, if downward force (force in a direction of an arrow F illustrated in FIG. 2) is applied to the assist grip 20, a compression load is applied to the central leg 34A in such a manner that the central leg 34A is compressed in the extending direction thereof.

As illustrated in FIG. 1, two lateral legs 34B and 34C, when being mounted on the vehicle body, are arranged at substantially the same height position as the main body 31 (alternatively, a slightly upper side position). Therefore, when the assist grip 20 is normally used, if the downward force is applied to the assist grip 20, tensile loads are respectively applied to the lateral legs 34B and 34C in such a manner that the lateral legs 34B and 34C are stretched in the extending direction thereof.

Then, two lateral legs 34B and 34C respectively have four semicircular notched portions as a weak portion.

Hereinafter, using the lateral leg 34B as an example, a positional relationship of notched portions 36a to 36d which are formed in the lateral legs 34B and 34C will be described with reference to FIG. 4.

Figure 4:
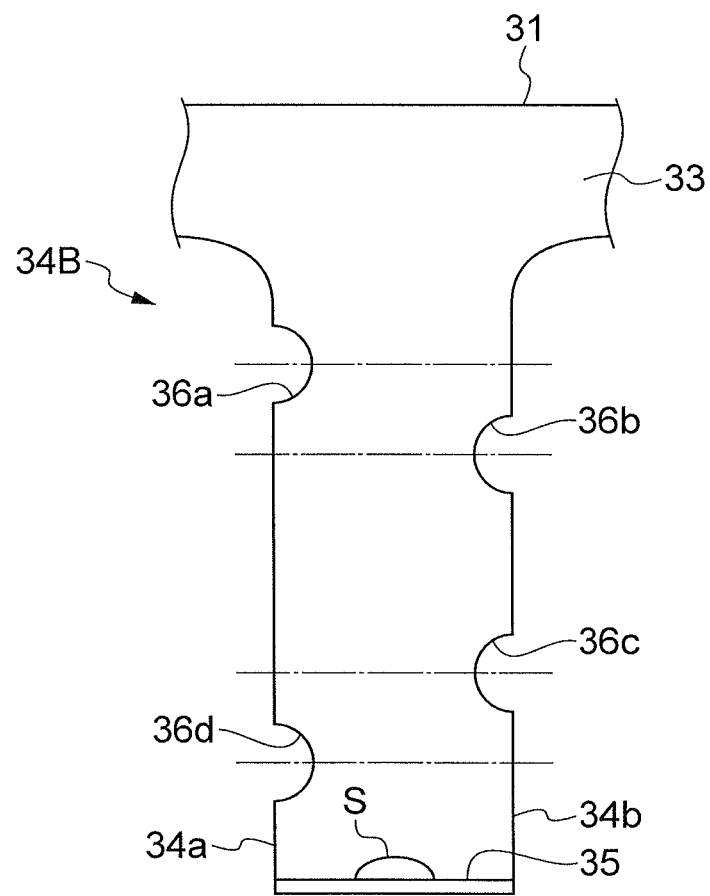
FIG. 4 is a view illustrating a leg (lateral leg) of the bracket in FIG. 3.

As illustrated in FIG. 4, out of both edges 34a and 34b of the lateral leg 34B, the notched portions 36a and 36d are formed in one side edge 34a, and the notched portions 36b and 36c are formed in the other side edge 34b.

Then, both positions of the notched portions 36a and 36d of the edge 34a and the notched portions 36b and 36c of the edge 34b are different from each other in the extending direction (vertical direction in FIG. 4) of the lateral leg 34B. That is, positions (positions of a chain line in FIG. 4) of semicircular apexes of the notched shapes are different from each other in the extending direction of the lateral leg 34B.

More specifically, in the extending direction of the lateral leg 34B, the notched portions 36a to 36d are arranged so that two notched portions 36b and 36c aligned adjacent to each other on the edge 34b are interposed between two notched portions 36a and 36d aligned adjacent to each other on the edge 34a. In other words, the notched portion 36a of the edge 34a is located at the further main body 31 side than the notched portion 36b of the edge 34b, and the notched portion 36d of the edge 34a is located at the further mounting portion 35 side than the notched portion 36c of the edge 34b.

Even in the lateral leg 34C, the positional relationship of the notched portions 36a to 36d is similar to the positional relationship of the notched portions 36a to 36d of the above-described lateral leg 34B. However, the positions of the notched portions 36a to 36d in the lateral leg 34C are in a mirror image relationship, where left and right sides are reversed, with the positions of the notched portions 36a to 36d in the lateral leg 34B.

If the notched portions 36a to 36d of the lateral legs 34B and 34C are set to have the above-described positional relationship, when the compression load is applied to the lateral legs 34B and 34C, the lateral legs 34B and 34C are likely to buckle while being twisted.

That is, unlike an aspect when the assist grip 20 is normally used, when excessive impact force is applied in a pressing direction (direction of an arrow P illustrated in FIG. 2) of the assist grip 20, the compression load is applied to the lateral legs 34B and 34C. Then, this causes four notched portions 36a to 36d which are weak portions formed on the respective edge 34a and 34b of the lateral legs 34B and 34C to be bent, thereby eventually bending the portions thereof.

Figure 5A:
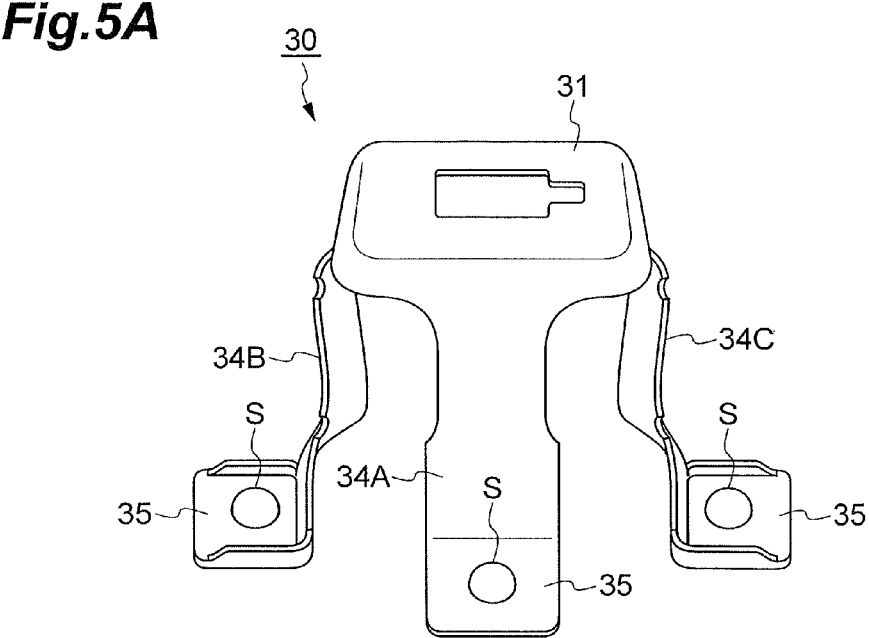
FIG. 5A is a front view illustrating a state where the bracket in FIG. 3 is bent.
Figure 5B:
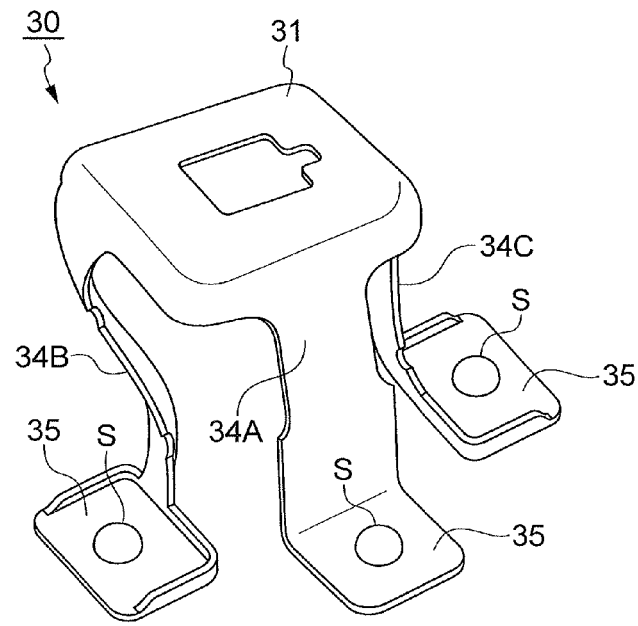
FIG. 5B is a perspective view illustrating a state where the bracket in FIG. 3 is bent.

At this time, as described above, in the notched portions 36a to 36d of the lateral legs 34B and 34C, with respect to the extending direction of the lateral legs 34B and 34C, the positions of the notched portions 36a and 36d of the edge 34a are different from the positions of the notched portions 36b and 36c of the edge 34b. Accordingly, as illustrated in FIGS. 5A and 5B, both of the lateral legs 34B and 34C buckle while being twisted.

The present inventors have newly recognized through the following experiments that when the lateral legs 34B and 34C buckle while being twisted in this way, the above-described impact force against the assist grip 20 is effectively absorbed.

That is, as an experiment relating to absorption of the impact force against an assist grip, the present inventors measured a displacement of the assist grip in the pressing direction thereof, and a load applied to the assist grip at that time, when the impact force was applied in the pressing direction of the assist grip. The results were as illustrated by graphs L1 to L3 in FIG. 6.

Figure 6:
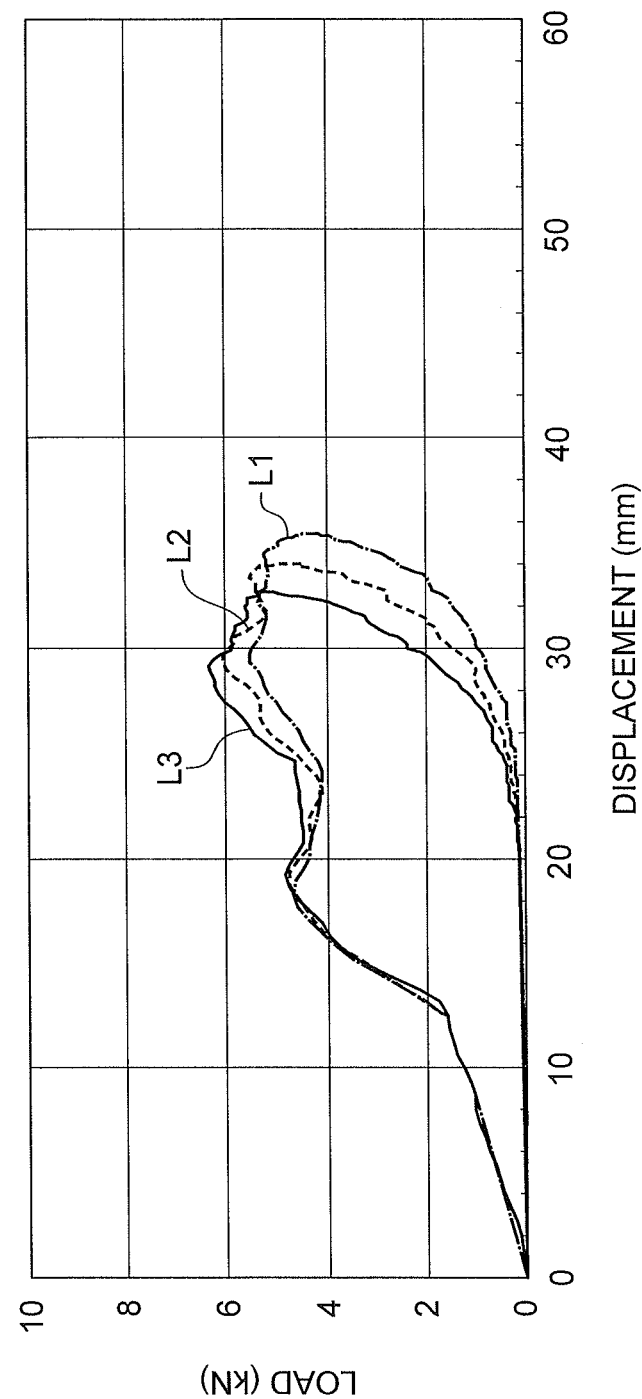
FIG. 6 is a graph illustrating results on experiments relating to impact absorption of an assist grip, which have been conducted by the present inventors.

Here, the graph L1 (chain line) in FIG. 6 illustrates the measured result on the lateral legs 34B and 34C provided with the notched portions 36a to 36d which are arranged as described above. The graph L1 shows that the displacement of the assist grip is relatively large during the impact and the load is kept low to some extent. Such a movement of the graph L1 means that an impact absorption capacity is high since impact energy is gradually absorbed.

The reason why the high impact absorption capacity can be obtained when the lateral legs 34B and 34C are employed may be because the notched portions 36a and 36d of the edge 34a and the notched portions 36b and 36c of the edge 34b are located at the different positions in the extending direction of the lateral legs 34B and 34C. In such a positional relationship, the lateral legs 34B and 34C buckle while being twisted as illustrated in FIGS. 5A and 5B.

In addition, the graphs L2 and L3 in FIG. 6 illustrate the measured results of a comparative experiment on a lateral leg where notched portions of both edges are located at the same position.

Figure 7:
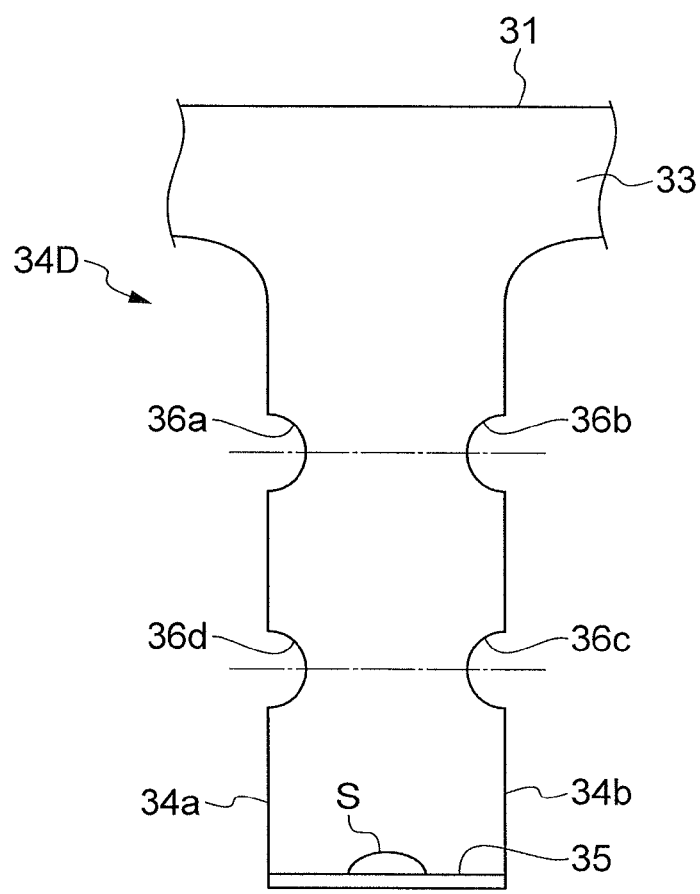
FIG. 7 is a view illustrating a lateral leg used in the experiment of FIG. 6.

The graph L2 (dashed line) in FIG. 6 illustrates the measured result on a lateral leg 34D provided with notched portions 36a to 36d which are arranged as illustrated in FIG. 7. That is, it is the result measured by replacing the lateral legs 34B and 34C with the lateral leg 34D out of the above-described bracket 30.

As illustrated in FIG. 7, similarly to the lateral legs 34B and 34C, the lateral leg 34D has four notched portions 36a to 36d. However, the lateral leg 34D is different from the lateral legs 34B and 34C in that the notched portions 36a and 36d of the edge 34a are located at the same position as the notched portions 36b and 36c of the edge 34b in the extending direction of the lateral leg 34D.

The graph L2 in FIG. 6 shows that the displacement of the assist grip during the impaction is smaller than that of the graph L1, and a load greater than that of the graph L1 is applied thereto. Such a movement of the graph L2 means that in order to complete the deformation within a shorter time than the graph L1, the impact force collides with the assist grip, thereby increasing a peak of the load instantaneously acting on a side to which the impact force is applied.

The reason why the sufficient impact absorption capacity is not available when the lateral leg 34D is employed may be because the notched portions 36a and 36d of the edge 34a are located at the same position as the notched portions 36b and 36c of the edge 34b in the extending direction of the lateral leg 34D. In such a positional relationship, the lateral leg 34D buckles so that the positions of the chain line in FIG. 7, where the notched portions are transversely aligned with each other, have a mountain shape or a valley shape and thus the notched portions are bent to be overlapped with each other.

Figure 8:
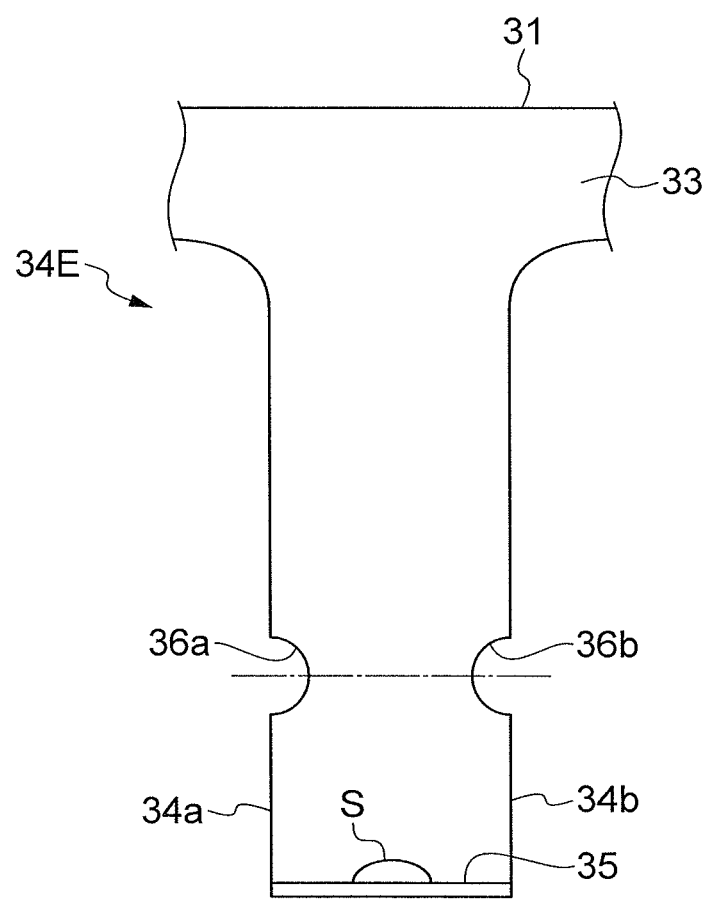
FIG. 8 is a view illustrating a lateral leg used in the experiment of FIG. 6.

The graph L3 (solid line) in FIG. 6 illustrates the measured result on a lateral leg 34E provided with notched portions 36a and 36b which are arranged as illustrated in FIG. 8. That is, it is the result measured by replacing the lateral legs 34B and 34C with the lateral leg 34E out of the above-described bracket 30.

As illustrated in FIG. 8, the lateral leg 34E has two notched portions 36a and 36b. The notched portion 36a of the edge 34a and the notched portion 36b of the edge 34b are located at the same position as each other in the extending direction of the lateral leg 34E.

The graph L3 in FIG. 6 shows that the displacement of the assist grip during the impaction is further smaller than that of the graph L2, and a load further greater than that of the graph L2 is applied thereto. Such a movement of the graph L3 means that the impact energy is further vigorously absorbed than that of the graph L2 and the impact absorption capacity is very low.

The reason why the impact absorption capacity is low when the lateral leg 34E is employed is considered that the notched portion 36a of the edge 34a is located at the same position as the notched portion 36b of the edge 34b in the extending direction of the lateral leg 34E, in the same manner as when the lateral leg 34D is employed. In such a positional relationship, the lateral leg 34E buckles so that the positions of the chain line in FIG. 8, where the notched portions are transversely aligned with each other, have a mountain shape or a valley shape and thus the notched portions are bent to be overlapped with each other.

In a case where the impact force absorption capacity cannot be sufficiently obtained as is the lateral leg 34D or the lateral leg 34E, it becomes necessary to change a structure thereof by increasing the length of the leg in order to enhance the impact force absorption capacity. Thus, there are disadvantages such as a degraded degree of freedom in the interior design inside the passenger compartment.

As described above, in the mounting structure of the assist grip according to the above-described embodiment, total four notched portions 36a to 36d, two for each of both edges 34a and 34b, are formed in the lateral legs 34B and 34C to which the tensile load is applied when the assist grip 20 is normally used. The positions of the notched portions 36a and 36d of the edge 34a and the positions of the notched portions 36b and 36c of the edge 34b are different from each other in the extending direction of the lateral legs 34B and 34C.

In such a mounting structure of the assist grip, when excessive impact force is applied to the assist grip 20 and a compression load is applied to the lateral legs 34B and 34C, four notched portions 36a to 36d which are formed at the respective edges 34a and 34b of the lateral legs 34B and 34C are bent. At this time, the positions of the notched portions 36a and 36d of the edge 34a and the positions of the notched portions 36b and 36c of the edge 34b of the lateral legs 34B and 34C are different from each other in the extending direction of the lateral legs 34B and 34C. Accordingly, the lateral legs 34B and 34C buckle while being twisted. If the lateral legs 34B and 34C buckle while being twisted in this way, as described above by using the graphs in FIG. 6, the impact force against the assist grip 20 is efficiently absorbed as compared to a case where the legs buckle by being bent so as to be overlapped with each other.

In particular, in the mounting structure of the assist grip according to the above-described embodiment, the notched portions 36a to 36d are arranged so that two notched portions 36b and 36c which are aligned adjacent to each other on the edge 34b are interposed between two notched portions 36a and 36d which are aligned adjacent to each other on the edge 34a in the extending direction of the lateral legs 34B and 34C. Accordingly, the lateral legs 34B and 34C are likely to be twisted.

The present invention is not limited to the above-described embodiment, but can be modified in various ways.

For example, only the embodiment has been exemplified where the number of the notched portions are four and two notched portions are disposed at each of both edges. However, as far as the legs buckle while being twisted, three or more notched portions may be disposed at the edges. In addition, the shape of the notched portions, without being limited to the semicircular shape, may be a triangular shape, a square shape or an elongated slit shape. However, the notched portions are formed in the legs to which the tensile load is applied when the assist grip is normally used. Accordingly, from a viewpoint of avoiding excessive stress concentration, it is preferable that the shape of the notched portions be configured to be a curve such as the semicircular shape.

In addition, the number or the shape of the legs of the bracket can be appropriately changed. For example, if the bracket is provided with two legs, the tensile load is applied to one leg when the assist grip is normally used. Accordingly, notched portions having the above-described positional relationship may be formed in the leg thereof. In addition, the shape of the legs may be rectangular as is in the above-described embodiment. However, for example, within a range not to impair an operation effect, the shape can also be changed so as to have a tapered shape by slightly narrowing a width of the vehicle body side compared to the main body side of the bracket.

The weak portion is preferably configured to have the notched portion since it is easy to form the notched portion. However, if the portion triggers the buckling, without being limited to the notched portion, the portion may be partially thinned, for example.

What is claimed is:

1. A mounting structure of an assist grip in which the assist grip is mounted on a vehicle body via a bracket,
    wherein the bracket comprises
    a bracket main body on which the assist grip is mounted;
    a plurality of plate-shaped legs which extend from the bracket main body, wherein each of tip portions of the plurality of legs is connected to the vehicle body,
    wherein out of the plurality of legs, a plurality of weak portions are formed at each of both edges of the leg to which a tensile load is applied when the assist grip is normally used, and
    wherein a position of the weak portion of one side edge is different from a position of the weak portion of the other side edge in an extending direction of the leg.

2. The mounting structure of an assist grip according to claim 1,
    wherein in the extending direction of the leg, a plurality of weak portions are arranged in the leg such that two weak portions aligned adjacent to each other on one side edge are interposed between two weak portions aligned adjacent to each other on the other side edge.

3. The mounting structure of an assist grip according to claim 2,
    wherein the two weak portions aligned adjacent to each other on one side edge are arranged upside of the vehicle and the two weak portions aligned adjacent to each other on the other side edge are arranged downside of the vehicle.

4. The mounting structure of an assist grip according to claim 1,
    wherein the plurality of the legs are three legs consisting of one leg to which a compression load is applied when the assist grip is normally used and two legs to which a tensile load is applied when the assist grip is normally used.

5. The mounting structure of an assist grip according to claim 4,
    wherein the one leg to which a compression load is applied when the assist grip is normally used is a central leg located centrally and below, and the two legs to which a tensile load is applied when the assist grip is normally used are two lateral legs located on either side of the central leg.

6. The mounting structure of an assist grip according to claim 5,
    wherein the two lateral legs are arranged at substantially the same height position as the bracket main body or upper side position relative to the bracket main body.

7. The mounting structure of an assist grip according to claim 4,
    wherein the bracket main body has a square plate shape,
    wherein the bracket further comprises a flange portion which extends to surround the bracket main body along a normal direction from an edge of the bracket main body, and
    wherein the three legs extend from the edge of the bracket main body in the same direction as the flange portion.

8. The mounting structure of an assist grip according to claim 1,
    wherein the weak portion is notched.

9. The mounting structure of an assist grip according to claim 8,
    wherein the notched shape is configured to be a curve.

* * * * *